(12) United States Patent
Waitkus, Jr.

(10) Patent No.: US 7,146,294 B1
(45) Date of Patent: Dec. 5, 2006

(54) WEIGHING BALED MATERIAL

(75) Inventor: Richard E. Waitkus, Jr., Houston, TX (US)

(73) Assignee: MGM Services, Inc., Houston, TX (US)

( * ) Notice: Subject to any disclaimer, the term of this patent is extended or adjusted under 35 U.S.C. 154(b) by 176 days.

(21) Appl. No.: 10/774,323

(22) Filed: Feb. 6, 2004

Related U.S. Application Data

(60) Provisional application No. 60/445,498, filed on Feb. 6, 2003, provisional application No. 60/445,720, filed on Feb. 6, 2003.

(51) Int. Cl.
*G08B 21/18* (2006.01)
*B30B 15/26* (2006.01)
*G01G 19/00* (2006.01)

(52) U.S. Cl. ............ 702/188; 177/245; 340/613; 53/502; 100/99

(58) Field of Classification Search ........ 177/136, 177/245; 340/613; 702/188; 53/502; 100/99
See application file for complete search history.

(56) References Cited

U.S. PATENT DOCUMENTS

| | | | |
|---|---|---|---|
| 4,512,253 A * | 4/1985 | La Barge et al. ........ 100/351 |
| 4,742,880 A * | 5/1988 | Schrag et al. ........ 177/136 |
| 4,773,027 A * | 9/1988 | Neumann ........ 702/188 |
| 5,016,197 A * | 5/1991 | Neumann et al. ........ 702/188 |
| 5,173,866 A * | 12/1992 | Neumann et al. ........ 702/188 |
| 5,214,594 A * | 5/1993 | Tyler et al. ........ 702/43 |
| 5,303,642 A * | 4/1994 | Durbin et al. ........ 100/50 |
| 5,384,436 A * | 1/1995 | Pritchard ........ 177/136 |
| 5,558,013 A * | 9/1996 | Blackstone, Jr. ........ 100/35 |
| 6,123,017 A * | 9/2000 | Little et al. ........ 100/35 |
| 6,232,565 B1 | 5/2001 | Gottlober ........ 177/136 |
| 6,248,963 B1 | 6/2001 | Gottlober ........ 177/136 |
| 6,360,186 B1 * | 3/2002 | Durbin ........ 702/188 |
| 6,378,276 B1 | 4/2002 | Dorge et al. ........ 53/202 |
| 6,408,261 B1 * | 6/2002 | Durbin ........ 702/188 |
| 6,453,270 B1 * | 9/2002 | Durbin ........ 702/188 |
| 6,561,085 B1 * | 5/2003 | Durbin et al. ........ 100/50 |
| 6,687,656 B1 * | 2/2004 | Durbin et al. ........ 702/188 |

OTHER PUBLICATIONS

One Plus Corp., *Baler Boss Baler Control System*, at HTTP://WWW.ONEPLUSCORP.COM/PDF/BALERBOSS.PDF, undated (Copyright 2003).
One Plus Corp., *Baler Boss: Deters Unauthorized Baler Use and Records Bales Made*, at http://www.onepluscorp.com/enduser/print-BalerBoss.asp, undated (Copyright 2004).
One Plus Corp., *BaleEdge Software: Comprehensive Remote Monitoring and Management of Balers*, at HTTP://WWW.ONEPLUSCORP.COM/ENDUSER/PRINT-BALEEDGE.ASP, undated (Copyright 2004).
"Marathon's StockRoom Baler" (www.MarathonEquipment.com) Jun. 21, 2006.*
"RJ-250 Sc Self-Contained Compactor" (www.MarathonEquipment.com) Jun. 21, 2006.*

* cited by examiner

Primary Examiner—Randy W. Gibson
(74) Attorney, Agent, or Firm—Baker Botts L.L.P.

(57) ABSTRACT

An apparatus, a method, and a system are provided for measuring and reporting the weight of bales in a baler. The weight may be determined by a variety of methods. The system may display or store the weight of the bale in the baler. The system may schedule the removal of bales or track the number of bales produced, weight of the bales produced, or value of the bales produced. The system may determine an appropriate time to accomplish the scheduling of the removal of the bales.

33 Claims, 6 Drawing Sheets

WEIGHING BALED MATERIAL

CROSS-REFERENCE TO RELATED APPLICATION

This application claims priority to commonly owned U.S. provisional patent application Ser. No. 60/445,498, filed Feb. 6, 2003, entitled "Determining an Optimal Pick-Up Time of a Waste Container," by Rick Waitkus and commonly owned U.S. provisional patent application Ser. No. 60/445,720, filed Feb. 6, 2003, entitled "Weighing Baled Material," by Rick Waitkus.

BACKGROUND OF THE INVENTION

1. Field of the Invention

The present invention is related to an apparatus, a method, and a system for weighing and managing baled material. More specifically, the present invention is directed at weighing baled material, tracking the weight of baled material, and scheduling the removal of baled material.

2. Description of the Related Art

Current balers allow materials to be compacted and bound, allowing a greater volume of material to be transported in a limited amount of space. Furthermore, by allowing for the banding of the material, balers help keep the material together, making it less likely to shift in transport.

Balers come in many configurations, but perform the same function. See, e.g., U.S. Pat. Nos. Re. 28,748, U.S. Pat. No. 3,955,942. Balers allow for material to be placed into a chamber. The user of the baler can activate a compression mechanism to compact the material in the chamber. This compression may be preformed horizontally or vertically. The compressed material forms a bale. The baler may allow for manual or automatic tying of wire, twine, or another material around the bale. Finally, the baler allows for automatic or manual ejecting of the bale from the baler.

While baled material may just be refuse, often the baled material is valuable. Such valuable materials may include paper products (e.g., cardboard boxes), scrap metal (e.g., aluminum cans), and tobacco. Therefore, it would be valuable for the owner of the material to determine the weight of the baled material, to insure that they are adequately compensated for the material.

Furthermore, some businesses are required to recycle some percentage of their trash, so they need a method for tracking the amount of material they recycle.

SUMMARY OF THE INVENTION

In general, in one aspect, the invention features a material management system for tracking one or more bales of material at one or more locations. The system includes one or more balers at one or more of the locations, each baler adapted to produce a bale; one or more weight measurement devices in communication with one or more balers, each weight measurement device adapted to determine the weight of a bale; one or more weight recording devices to record the weight of a bale.

Implementations of the invention may include one or more of the following. The weight measurement devices may include a load cell. The weight measurement devices may be adapted to perform weight measurement using one or more of the following procedures: measure a distance traveled by a compression plate in a baler when it compacts material in the baler, and based on the distance traveled by the compression plate, determine the weight of the bale; measure a pressure on the compression plate when it compacts material in the baler, and based on the measured pressure, determine the weight of the bale; or measure a current drawn by the motor used to compact the material within the baler, and based on the measured current, the determine the weight of the bale; measure a pressure exerted by an ejector coupled to the baler while it ejects the bale, and based on the measured pressure, determine the weight of the bale; and measure a current drawn by the ejector while ejecting the bale, and based on the measured current, the determine the weight of the bale. The one or more weight recording devices may record the weight of the bale in a baler. The one or more weight recording devices may record a number of bales ejected from one or more balers; and may record a weight of each bale ejected from one or more balers. The one or more weight recording devices, for one or more balers: may determine when the baler will reach a target level of fullness; based on the weight of the bale in the baler and customer usage patterns. The target level of fullness may be about completely full. The one or more weight recording devices may record the weight of one or more bales. For each of the balers: one or more weight recording devices may determine the fullness of the baler based on the weight of the bale in the baler and properties of the material in the baler, including density. The one or more weight recording devices: may determine when one or more bales should be removed from a location; and may notify a bale hauler of when the bales should be removed. The one or more weight recording devices may be located at a customer location; and one or more weight recording devices may be located at a recycler location. The weight recording device may remotely record the weight and number of bales ejected from one or more balers; and remotely determine when one or more bales should be removed from a location. Remotely determining when to remove one more bales from a location may include considering customer preferences or bale hauler limitations. The system may include one or more sensors for measuring one or more quantities related to the weight of the bale. The sensors may be in communication with the baler and producing an output. The one or more weight measurement devices may be in communication with one or more sensors; and the one or more weight measurement devices may remotely determine the weight of the material in a baler based output of the one or more sensors.

In general, in another aspect, the invention features a method for managing material at one or more locations, including, at one or more locations: aggregating material into a bale in a baler; determining a weight of the bale in the baler; and determining when the baler will reach a target fullness for the baler based on baler usage.

Implementations of the invention may include one or more of the following. The target fullness is when the baler is about completely full. Determining the weight of the bale in the baler may include measuring one or more quantity from the following: the weight of the bale; a distance traveled by a compression plate in a baler when it compacts material in the baler; a pressure on the compression plate when it compacts material in the baler; a current drawn by the motor used to compact the material within the baler, a pressure exerted by an ejector coupled to the baler while it ejects the bale; and a current drawn by the ejector while ejecting the bale. The method may include determining when to eject the bale. The method may include, for one or more locations: recording a number and weight of ejected bales; determining when to remove one or more bales from the location, considering when the baler will reach the target fullness. Determining when to remove one or more bales may include considering the number of ejected bales, the weight of ejected bales, and the weight of the bale in the baler. Determining when to remove one or more bales may include receiving and considering user input. The method may include determining when to accomplish the scheduling of bale removal. Determining when to remove one or more bales may include considering one or more customer preferences. Determining when to remove one or more bales may include considering one or more bale hauler limitations. The determination of when to remove one or more bales from the location may be performed at a remote location.

In general, in another aspect, the invention features a baler adapted to prepare a bale of recyclable material. The baler includes a compression plate in communication with a piston, the compression plate and piston adapted to compact material in the baler; one or more sensors for measuring one or more quantities related to the weight of the bale, the sensors in communication with the baler; a computational device in communication with the sensor for determining the weight of the bale based on the measured quantity; and a weight recording device in communication with the computational device, where the weight recording device records the weight of the bale.

Implementations of the invention may include one or more of the following. The weight recording device may be adapted to determine a fullness of the baler. The computational device may be adapted to send a signal indicative of the fullness of the baler. The computational device may be adapted to send a signal indicative of the weight of the material in the baler. The weight recording device may be adapted to determine a projected full time when the baler will reach a target level of fullness for the baler. The weight recording device may be adapted to send a signal indicative of the projected full time. The recyclable material may include one or more materials selected from the group consisting of: cardboard, glass, aluminum, steel, plastic, and paper.

Figure 1:
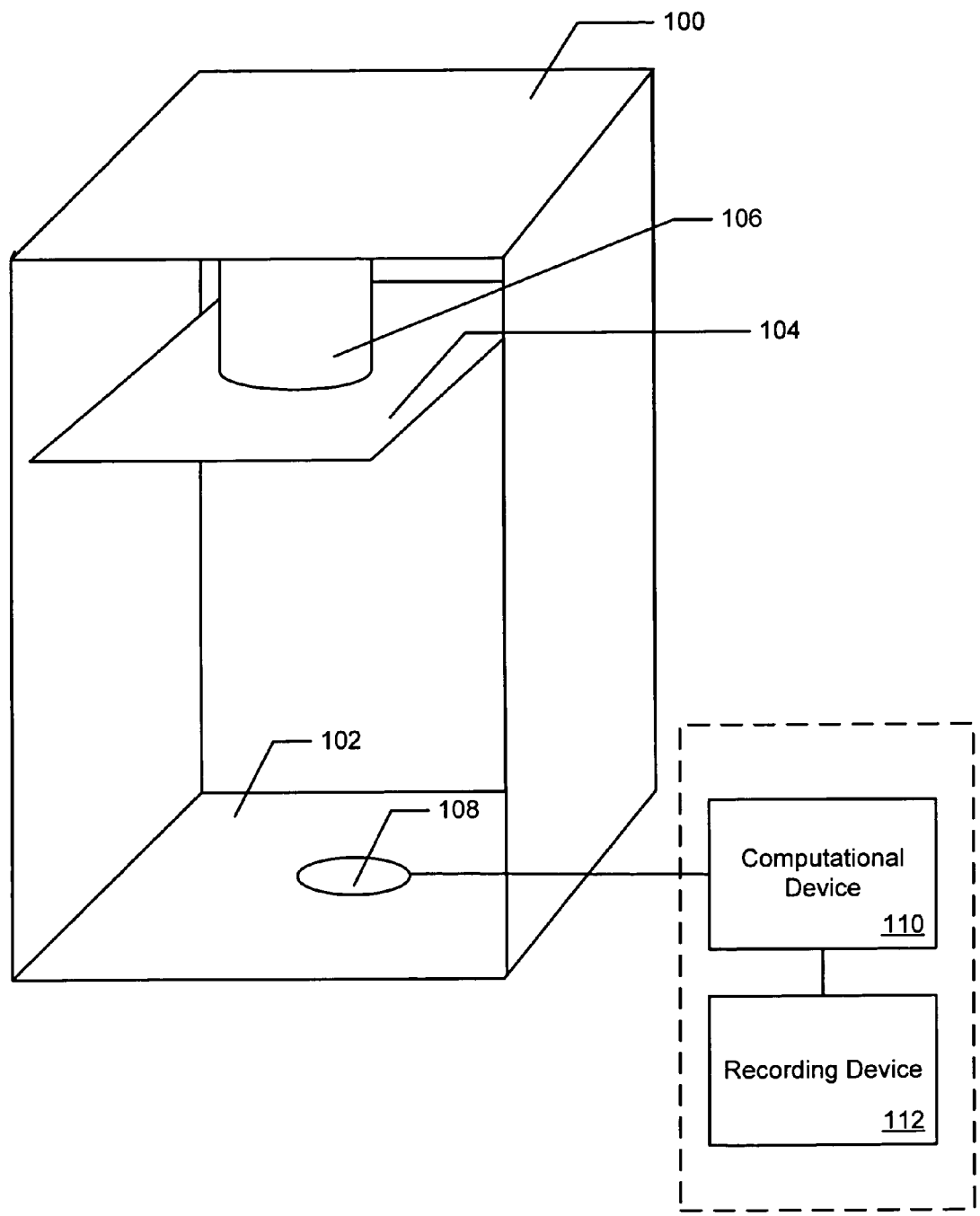
FIG. 1 is a view of a simplified vertical baler using the weighing system.

The present invention may be susceptible to various modifications and alternative forms. Specific examples of the present invention are shown by way of example in the drawings and are described herein in detail. It should be understood, however, that the description set forth herein of specific examples is not intended to limit the present invention to the particular forms disclosed. Rather, all modifications, alternatives and equivalents falling within the spirit and scope of the invention, as defined by the appended claims, are to be covered.

DETAILED DESCRIPTION

FIG. 1 is a simplified illustration of a vertical baler. Baler 100 has a floor 102, a compression plate 104, a piston 106 connected to compression plate 104, a sensor 108 affixed to floor 102, a computational device 110 in communication with the sensor 108, and a recording device 112 in communication with the computational device 110.

Figure 2:
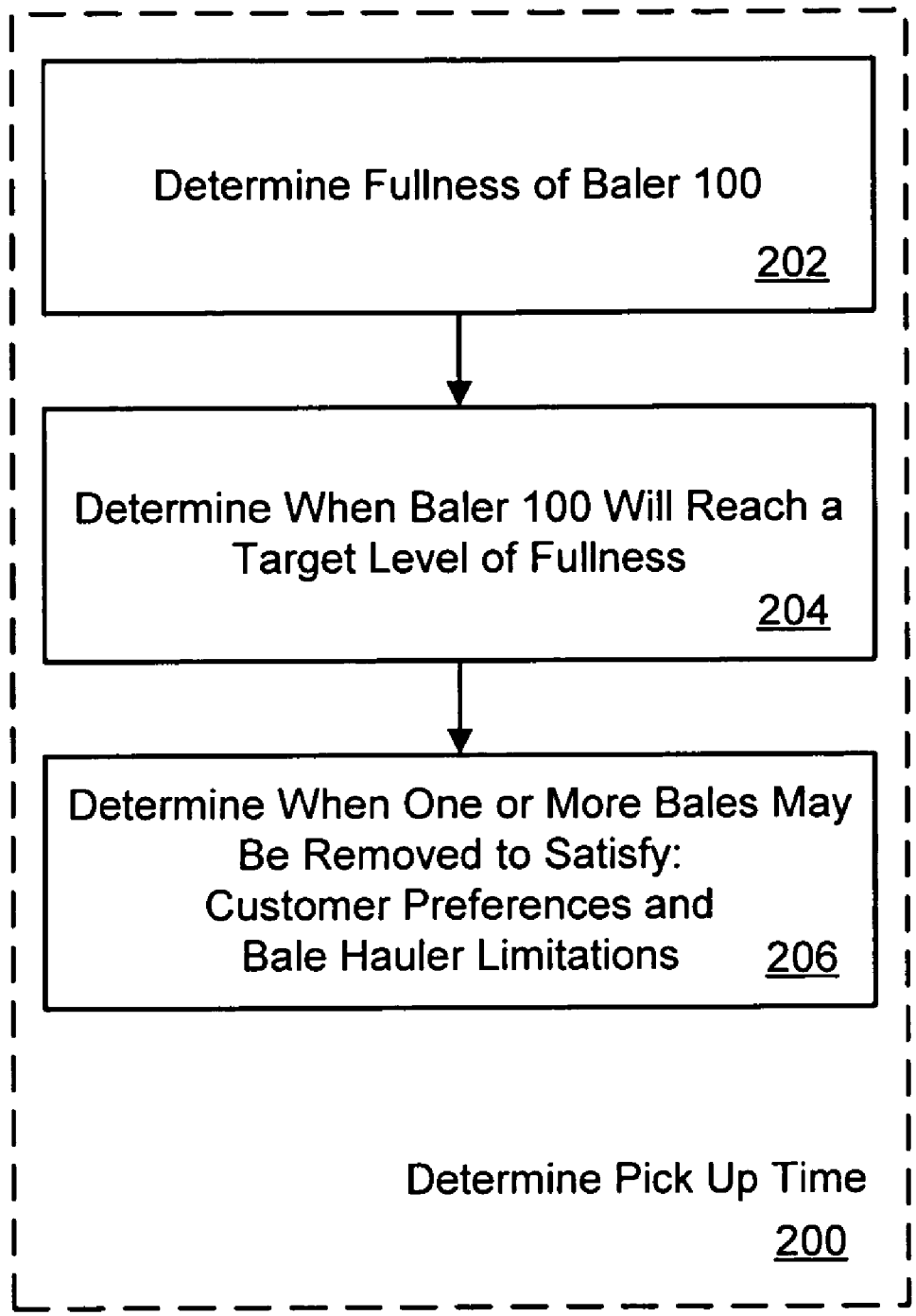
FIGS. 2–6 are flowcharts of the system.

FIG. 2 shows an example system that performs a process 200 to determine a pick up time for one or more bales (block 200). The system determines the fullness of the baler 100 (block 202). The system determines when the baler 100 will reach a target level of fullness (block 204). The system determines when the bale may be removed to satisfy customer preferences or bale hauler limitations (block 206).

Figure 3:
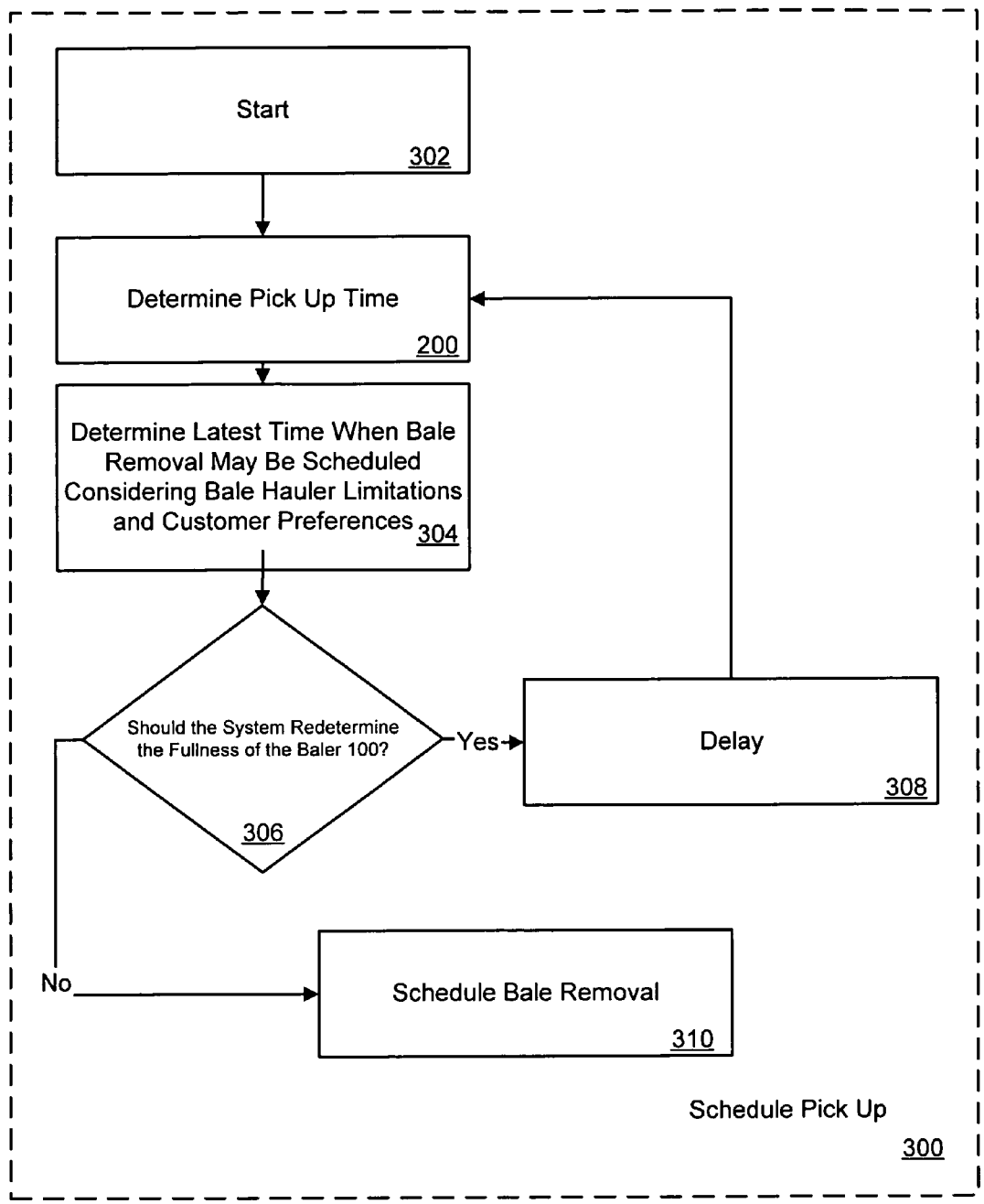

FIG. 3 shows an example system that performs a process 300 to schedule a pick up (block 300). The system starts the process (block 302). The system performs the process 200, as described with respect to FIG. 2 (block 200). The system determines the latest time when bale removal may be scheduled considering bale hauler limitations and customer preferences (block 304). The system determines if the fullness of the baler 100 should be redetermined (block 306). If the fullness of the baler 100 should be redetermined, the system delays for a period of time (block 308) and again performs process 200 (block 200). If the fullness of the baler 100 should not be redetermined, the system schedules bale removal (block 310).

Figure 4:
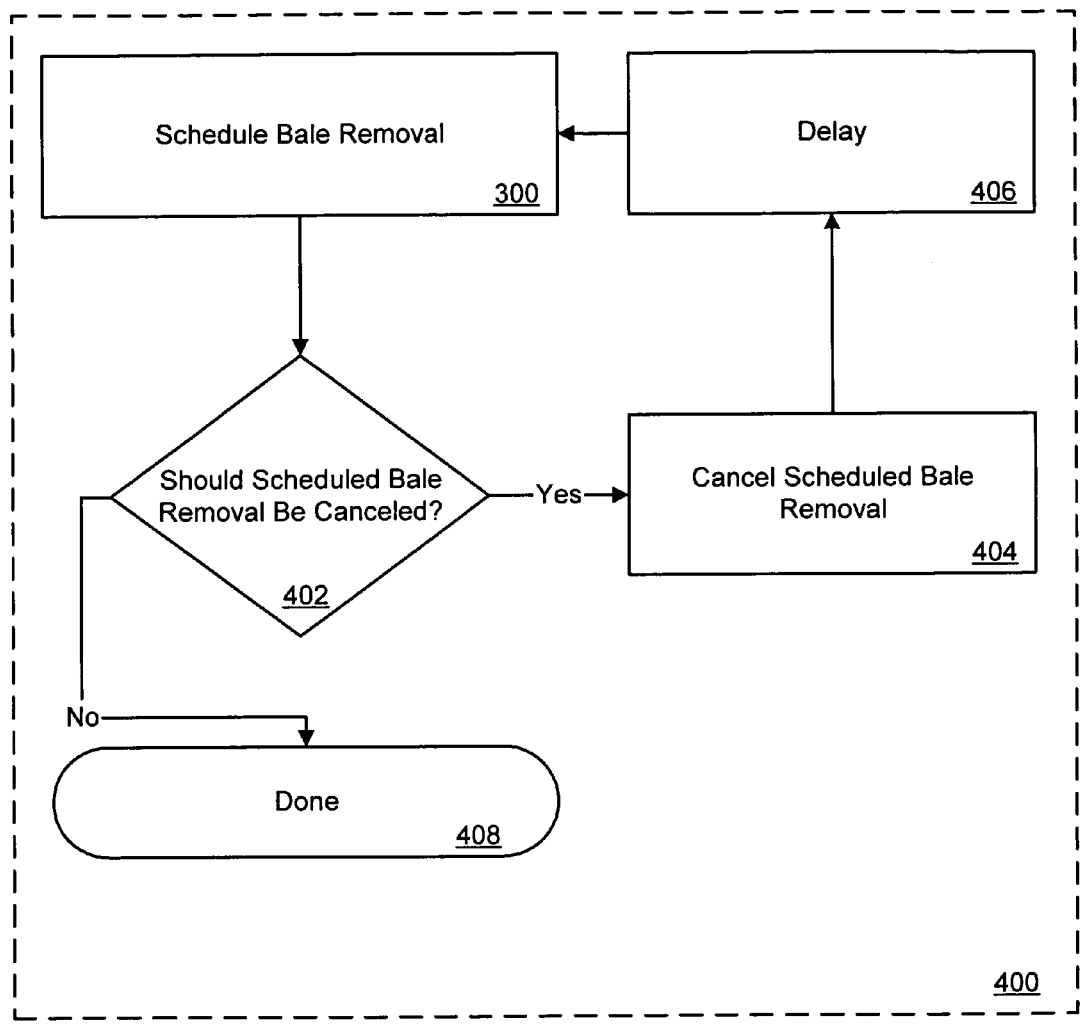

FIG. 4 shows an example system that performs a process 400 to schedule the pick up (block 400). The system performs the process 300, as described with respect to FIG. 3 (block 300). The system determines if the scheduled bale removal should be canceled (block 402). If the scheduled bale removal should be canceled, the system cancels the scheduled bale removal (block 404), delays for a period of time (block 406), and again performs process 300, as described with respect to FIG. 3 (block 300). If the scheduled bale removal should not be canceled, the system completes the process 400 (block 408).

Figure 5:
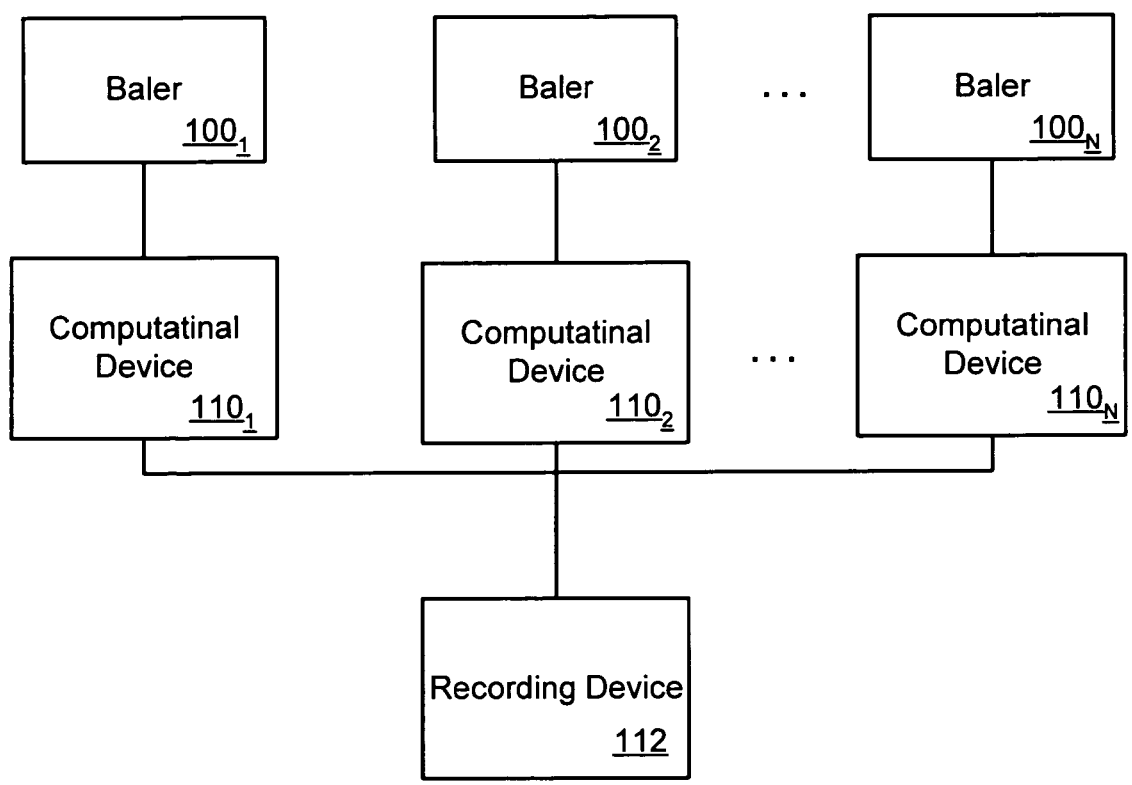

FIG. 5 shows an example system with a plurality of balers $100_{1...N}$, as described in FIG. 1, where each of the balers $100_{1...N}$ is in communication with one of a plurality of computational devices $110_{1...N}$, as described with respect to FIG. 1. All of the computational devices $110_{1...N}$ are in communication with a recording device 112, as described with respect to FIG. 1.

Figure 6:
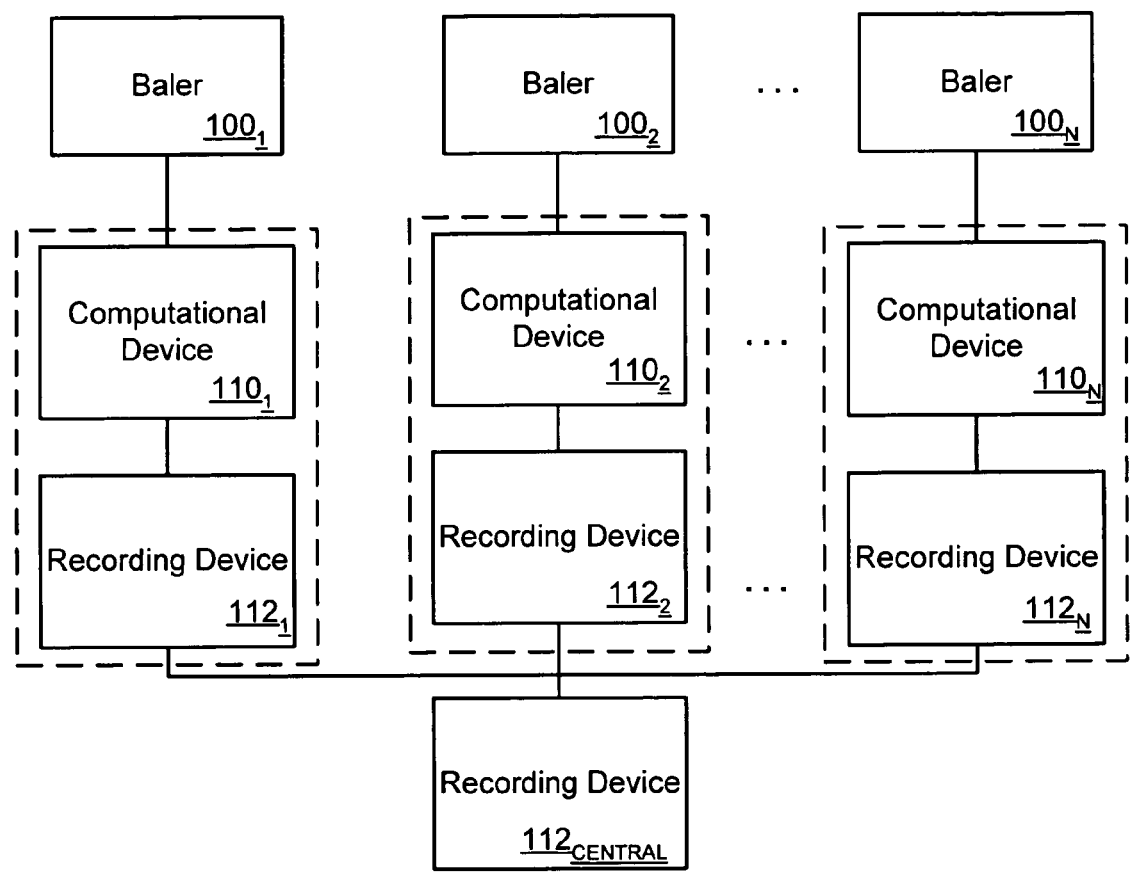

FIG. 6 shows an example system with a plurality of balers $100_{1...N}$, as described in FIG. 1, where each of the balers $100_{1...N}$ is in communication with one of a plurality of computational devices $110_{1...N}$, as described with respect to FIG. 1. Each of the computational devices $110_{1...N}$ are in communication with one of a plurality of recording devices $112_{1...N}$, as described with respect to FIG. 1. All of the computational devices are in communication with a recording device $112_{CENTRAL}$, as described with respect to FIG. 1.

When used as a noun in this application the word bale means the material in or the material ejected from the baler 100, whether or not the material is banded. In this application, the terms "remove" and "pick up" from a location both refer to removing one or more bales from a location, rather than ejecting a bale from the baler.

Determining Weight

The present invention has a weight measuring device. The weight measuring device includes the sensor 108 and the computational device 110.

In one example system, the weight of the material in the baler 100 is determined by using the sensor 108, which is a pressure sensor in this example. The sensor 108 may be affixed to the baler floor 102 or the pressure sensor 108 may be separate from the baler 100. The sensor 108 may be a load cell, a strain gauge, or a spring. The sensor has an output which reflects, for example, the amount of pressure exerted on the sensor. To determine the weight, sensor 108 is connected to the computational device 110.

In another example system, sensor 108 is a pressure transducer or a pressure switch are attached to the piston 106 so that the transducer or switch senses the pressure exerted on the compression plate 104 or the pressure exerted by the compression plate 104. The piston 106 may communicate with a hydraulic system for actuating the piston. One example system measures a pressure within the hydraulic system. The pressure measured by the transducer or switch is communicated to the computational device 110. In another example system where the compression plate 104 is driven by an electric motor, sensor 108 may be an amp-meter that measures the amount of current running though the motor while the ram is compacting the bale within the baler.

In another example system, sensor 108 is a distance measuring device connected, for example, to piston 106 or compression plate 104 to determine a distance of travel of the compression plate 104 or piston 106 while compacting material in the baler 100. For example, a wheel and rotational counter is affixed to the piston so that as the piston descends the wheel rotates, and the counter measures the number of rotations. This measurement is communicated to the computational device 110.

In another example system, the weight of the bale is determined when the bale is ejected from the baler 100. For example, when the bale is ejected from the baler 100 using a bale ejector (not shown), sensor 108 may be a pressure transducer or a pressure switch attached to the bale ejector so that the amount of pressure necessary to eject the bale is determined. Or, if the bale ejector is driven by an electric motor, sensor 108 may be an amp-meter to measure the amount of current running though the motor while the bale ejector is ejecting the bale from the baler 100. Either or both of these values are communicated to the computational device 110.

The computational device 110 may be affixed to the baler 100 or may be elsewhere. For example, the computational device may be a microprocessor controlled unit that is mounted to the baler 100. The computational device 110 may be a computer elsewhere in the same building as the baler 100, or the computational device 110 may be at a central office away from the baler 100.

Modes of communication between the sensor 108 and the computational device 110 may include any wire or wireless communication mode. For example, the sensor 108 and the computational device 110 may communicate via RS-232 serial communication. The sensor 108 and the computational device 110 may communicate via a telephone line using modems or FAX. The sensor 108 and the computational device 110 may communicate via a wireless link. The sensor 108 and the computational device 110 may be directly connected by a wire. Furthermore, the sensor 108 and the computational device 110 may be a single unit.

The computational device 110 may allow the user to input characteristics of the material in the baler 100, or the computational device 110 may have stored characteristics. For example, the computational device 110 may have a keypad or keyboard for the user to enter necessary characteristics. These characteristics may include a density of the material(s) in the baler 100, a composition of the material(s) in the baler 100, an average size of bales produced by the baler 100 or an average length, height, or depth of bales produced by the baler 100. Based on the characteristics of the material in the baler 100, and the measurements of any of the sensors described above, the computational device 110 will determine the weight of the material in the baler 100.

The computational device 110 may be calibrated by the use of an external weight measuring device or by using a calibration bale. A calibration bale is a bale with a known weight or a bale which emulates the bale of known weight. The calibration bale would be placed into the baler 100 and the baler 100 may be activated to compress the bale, or to eject the bale (based on the sensor used to determine the weight of the bale). The user would activate a calibration feature which may allow the user to provide necessary information about the calibration bale, such as the known weight, or to perform another calibration activity.

Reporting/Recording Weight

Another object of the present invention is to possibly display and possibly store the weight of the material in the baler 100. Toward that end, the computational device 110 may also communicate with the recording device 112$_{CENTRAL}$ to record measured weights in a permanent or semi-permanent medium. Such a medium may include memory, magnetic or optical disk, or tape.

Modes of communication between the computational device 110 and the recording device 112 may include any wire or wireless communication mode. For example, the computational device 110 and the recording device 112 may communicate via RS-232 serial communication. The computational device 110 and the recording device 112 may communicate via a telephone line using modems or FAX. The computational device 110 and the recording device 112 may communicate via a wireless link. The computational device 110 and the recording device 6 may be directly connected by a wire. Furthermore, the computational device 110 and the recording device 112 may be a single unit.

The recording device 112 may have a display such as a LCD or monitor. The recording device 112 may be an entire computer capable of storing and retrieving measured weights. The recording device 112 and the computational device 110 may be the same device. Also, the recording device 112 may be attached to the baler 100 or may be separate from the baler 100. One example recording device is located at a remote location, relative to the baler. Furthermore, the recording device 112 may have a printer to print directly on the bale or on a label which may be affixed to the bale. The printer records information allowing identification of the weight of the bale.

In one example system, the recording device 112 is a computer at a central office of a grocery store chain. Balers 100$_{1...N}$ from each of the stores communicate the weight of their bales with the recording device 112. In this example, the recording device 112 keeps track of a plurality of balers 1$_{1...N}$ and the weight of the bales in the balers 1$_{1...N}$. Because the bales produced may be valuable, the recording device may calculate the value of the one or more bales produced by the baler 100$_{1...N}$. Furthermore, an example recording device 112 accumulates a total value of bales produced, a total weight of bales produced, and a total number of bales produced.

In another example system, a plurality of customers sell baled recycled material to a commercial recycler. The customers have access to the weight of the bale in their baler 100 via their own recording device 112. Therefore, they are assured that the recycler is compensating them properly for the bales that they sell to the recycler. Furthermore the commercial recycler or a third party may have another recording device 112, centrally located in the recycler's office, to determine how much material each of the customers currently have on hand. Based on this information, the commercial recycler may schedule when to pick up bales from the customers. The commercial recycler may use the information collected from the recording device 112 when compensating the customers.

In another example system, one or more customers schedule removal of bales from their locations with the assistance of third parties who remotely monitor the fullness of their baler, and the number and weight of bales that the customer has produced over some period of time. The third parties may monitor the weight of the material in the baler and the number and weight of bales produced by the baler. The third party determines when to schedule the removal of bales from the customer's location. Furthermore, the third party determines when to accomplish the scheduling of removal of bales from the customer's location. The third party may wish to wait as late as possible to schedule the removal of bales to increase the cost efficiency of bale hauling for the customer.

Finalizing Weight

Because the computational device 110 may calculate the weight of the material in the baler 100 every time the baler 100 is activated for compression or even continuously, it may be useful to have a system to notify the recording device 112 when the material in the baler 100 has reached a final weight. In one example system, the user manually notifies the recording device 112 that the measured weight is the final weight by pressing a button or issuing a command. Alternatively, the system may automatically mark the measured weight as the final weight when the bale is ejected from the baler or when the bale has reached a specified weight.

Tracking Baler Usage

One example recording device 112 records and tracks the weight of the bale currently in the baler. Another example recording device 112 records the weight of each finalized bale and a date and time that the bale was produced, or ejected from the baler. Yet another example baler tracks the weight of bales ejected from the baler and the bale currently in the baler. Based on these recorded values, the recording device 112 may determine a total number of bales produced over some period of time (e.g., hours, days, weeks, years). The recording device 112 may also determine a total weight of bales produced over some period of time.

The recording device 112 may also determine usage patterns of the baler 100. The recording device 112 may determine the average number of bales produced for some period of time. For example, the recording device 112 may determine the number of bales produced per day, per day of the week, per week, or per year. The recording device 112 may also determine statistics about bale production including the average number of bales produced over some period of time and the average weight of bales produced over some period of time. The recording device 112 may recognize or account for baler usage patterns or peculiarities (e.g., the baler 100 is only used certain days of the week).

If the sensor 108 and computational device 110 determine the weight of the material in the baler 100 before the material in the baler 100 is ejected, the recording device may record the measured weights and the date and time the material in the baler 100 was weighed.

The recording device 112 may determine the weight of the material added to the baler 100 over some period of time. The recording device 112 may determine the weight added to the baler 100 per day, per day of the week, per week, or per year. The recording device 112 may calculate an average weight of material added to the baler 100 over some period of time, and account for customer usage patterns (e.g., the customer only adds material to the baler 100 on certain days of the week).

Predicting Baler Fullness

Based on one or more factors including the usage patterns or on the weight of the material in the baler 100 and the current fullness of the baler 100, the recording device 112 may determine a projected full time when the baler 100 will reach a target level of fullness. One example target level of fullness is when the baler is completely full, or about completely full. Another example target level of fullness is when the baler is fifty percent full, or some other percentage of fullness. Yet another example target level of fullness is when the bale in the baler reaches a target weight.

To increase accuracy, the recording device 112 may determine if baler 100 use is trending upward or downward, and consider this trend when determining the projected full time. The recording device 112 may also receive user input regarding the projected full time. The recording device 112 may use linear interpolation to determine the projected full time.

Based on the current fullness of the baler, recorded usage patterns, and the projected full time, one example recording device 112 determines when the baler will reach the target level of fullness and when to eject the material currently in the baler.

Scheduling Bale Removal From a Location

One example recording device 112 includes functionality that determines when one or more bales at a location should be removed. The example recording device may consider one or more factors including when the baler is predicted to reach a target level of fullness, usage patterns, and the number and weight of bales already produced by the baler. After determining when the one or more bales should be removed, the example recording device 112 schedules the removal of one or more bales from the customer's location. Another example recording device 112 also considers customer preferences and bale hauler limitations when determining and scheduling when the bales should be removed. The term customer, as used herein, refers to the person or entity using the baler 100.

One example system accounts for one or more customer preferences when scheduling bale removal. These preferences may include: when the customer is able to let the bale hauler remove the bale (e.g., when the customer is open or staffed) or whether the customer has the ability or desire to store bales (and if so how many bales the customer will store).

The example system may also account for the bale hauler limitations when scheduling bale removal. The bale hauler removes the bales from the customer. The limitations of the bale hauler may include: the number of vehicles and personnel able to retrieve bales at any point in time, the operating hours of the dispatcher for the bale hauler, the lead time necessary for the bale hauler to dispatch a vehicle and employee to remove the bale, the operating hours of the bale hauler, and the capacity of the bale hauler or a third party to accept the bale(s) removed from the customer.

The recording device 112 may determine an optimum time to remove the bale in order to satisfy customer preferences or bale hauler limitations. There may be a plurality of optimum times. The recording device may schedule bale removal at an optimum time. For example, an optimum time may be determined based on any one or a combination of the following considerations: when the baler will reach the target fullness, the current fullness of the baler, the number of ejected bales at the location, the customer preferences, and the bale hauler limitations.

After the recording device 112 has determined an optimal time to remove the one or more bales from the location, it may determine a latest time when to accomplish the scheduling of the bale removal to ensure that the one or more bales are removed at an optimal time. The recording device 112 may accomplish the scheduling before the latest time.

In one example, the recording device 112 and the bale hauler may communicate directly by wire or wireless communication. In another example, an operator may have a display of the status of the balers 100$_{1...N}$ and the latest times of each baler. Based on the information displayed to the operator he may manually call, fax, or email the bale hauler to schedule a time for bale removal before the latest time. Another example recording device 112 displays the predicted number of days until the scheduling of bale removal should be accomplished. Another example recording device displays an optimum pick up or removal time, or the time when the bales should be removed from the location.

While the invention has been depicted, described and is defined by reference to example systems, such references do not imply a limitation on the invention, and no such limitation is to be inferred. The invention is capable of considerable modification, alteration and equivalents in form and function, as will occur to those of ordinarily skill in the pertinent arts and having the benefit of this disclosure. The depicted and described embodiments of the invention are exemplary only, and are not exhaustive of the scope of the invention. Consequently, the invention is to be limited only by the spirit and scope of the appended claims, giving full cognizance to equivalents in all respects.

What is claimed is:

1. A recyclable material management system for tracking one or more bound bales of material at one or more locations, the system including:
   one or more balers at one or more of the locations, each baler adapted to produce a bound bale of recyclable material and each baler including a vertical compression plate;
   one or more weight measurement devices in communication with one or more balers, each weight measurement device adapted to determine the weight of the bale within one of the one or more balers;
   one or more weight recording devices to record the weight of the bale.

2. The material management system of claim 1, where one or more of the weight measurement devices include a load cell.

3. The material management system of claim 1, where:
   one or more of the weight measurement devices are adapted to perform weight measurement using one or more procedures selected from the group consisting of:
   measure a distance traveled by a compression plate in a baler when it compacts material in the baler, and based on the distance traveled by the compression plate, determine the weight of the bale;
   measure a pressure within a hydraulic system operable to compress material in the baler, while the hydraulic system compacts material in the baler, and based on the measured pressure, determine the weight of the bale;
   measure a pressure on the compression plate when it compacts material in the baler, and based on the measured pressure, determine the weight of the bale;
   measure a current drawn by a motor while compacting the bale, and based on the measured current, the determine the weight of the bale;
   measure a pressure exerted by an ejector coupled to the baler while it ejects the bale, and based on the measured pressure, determine the weight of the bale; and
   measure a current drawn by the ejector while ejecting the bale, and based on the measured current, the determine the weight of the bale.

4. The material management system of claim 1, where one or more weight recording devices record the weight of the bale in a baler.

5. The material management system of claim 1, where:
   one or more weight recording devices:
   record a number of bales ejected from one or more balers; and
   record a weight of each bale ejected from one or more balers.

6. The material management system of claim 1, where:
   one or more weight recording devices, for one or more balers:
   determine when the baler will reach a target level of fullness; based on the weight of the bale in the baler and customer usage patterns.

7. The material management system of claim 1, where the target level of fullness is about completely full.

8. The material management system of claim 1, where one or more weight recording devices record the weight of one or more bales.

9. The material management system of claim 6, where, for each of the balers: one or more weight recording devices determine the fullness of the baler based on the weight of the bale in the baler and properties of the material in the baler, including density.

10. The material management system of claim 1, where:
    one or more weight recording devices:
    determine when one or more bales should be removed from a location; and
    notify a bale hauler of when the bales should be removed.

11. The material management system of claim 1, where:
    one or more weight recording devices are located at a customer location; and
    one or more weight recording devices are located at a recycler location.

12. The material management system of claim 1, where a weight recording device:
    remotely records the weight and number of bales ejected from one or more balers;
    remotely determines when one or more bales should be removed from a location.

13. The material management system of claim 10, where remotely determining when to remove one more bales from a location includes considering customer preferences.

14. The material management system of claim 10, where remotely determining when to remove one more bales from a location includes considering bale hauler limitations.

15. The material management system of claim 1, including:
    one or more sensors for measuring one or more quantities related to the weight of the bale, the sensors in communication with the baler and producing an output; and where:
    one or more weight measurement devices are in communication with one or more sensors; and the one or more weight measurement devices remotely determine the weight of the material in a baler based output of the one or more sensors.

16. A method for managing recyclable material at one or more locations, including, at one or more locations:
   aggregating recyclable material into a bale in a baler with a vertical compression plate;
   determining a weight of the bale in the baler; and
   determining when the baler will reach a target fullness based on baler usage and binding said bale for transport.

17. The method of claim 16, where the target fullness is when the baler is about completely full.

18. The method of claim 16, where determining the weight of the bale in the baler includes measuring a quantity selected from the group consisting of:
   the weight of the bale;
   a distance traveled by a compression plate in a baler when it compacts material in the baler;
   a pressure on the compression plate when it compacts material in the baler;
   a current drawn by a motor while compacting the bale;
   a pressure exerted by an ejector coupled to the baler while it ejects the bale; and
   a current drawn by the ejector while ejecting the bale.

19. The method of claim 16, including determining when to eject the bale.

20. The method of claim 16, including, for one or more locations:
   recording a number and weight of ejected bales;
   determining when to remove one or more bales from the location, considering the projected full time.

21. The method of claim 20, where determining when to remove one or more bales includes considering the number of ejected bales, the weight of ejected bales, and the weight of the bale in the baler.

22. The method of claim 20, where determining when to remove one or more bales includes receiving and considering user input.

23. The method of claim 20, including determining when to accomplish the scheduling of bale removal.

24. The method of claim 20, where determining when to remove one or more bales includes considering one or more customer preferences.

25. The method of claim 20, where determining when to remove one or more bales includes considering one or more bale hauler limitations.

26. The method of claim 20, where the determination of when to remove one or more bales from the location is performed at a remote location, relative to the location of the baler.

27. A baler adapted to prepare a bound bale of recyclable material, including:
   a vertical compression plate in communication with a piston, the compression plate and piston adapted to compact material in the baler;
   one or more sensors for measuring one or more quantities related to the weight of the bale in the baler, the sensors in communication with the baler;
   a computational device in communication with the sensor for determining the weight of the bale based on the measured quantity; and
   a weight recording device in communication with the computational device, where the weight recording device records the weight of the bale.

28. The baler of claim 27, where the weight recording device is adapted to determine a fullness of the baler.

29. The baler of claim 28, where the computational device is adapted to send a signal indicative of the fullness of the baler.

30. The baler of claim 27, where the computational device is adapted to send a signal indicative of the weight of the material in the baler.

31. The baler of claim 27, where the weight recording device is adapted to determine when the baler will reach a target level of fullness.

32. The baler of claim 27, where the weight recording device is adapted to send a signal indicative of when the baler will reach a target level of fullness.

33. The baler of claim 27, where recyclable material includes one or more materials selected from the group consisting of: cardboard, glass, aluminum, steel, plastic, and paper.

* * * * *